Dec. 17, 1968
F. WENNER ETAL
3,417,354
MAGNETIC CIRCUIT CLOSER
Filed July 23, 1947
2 Sheets-Sheet 1
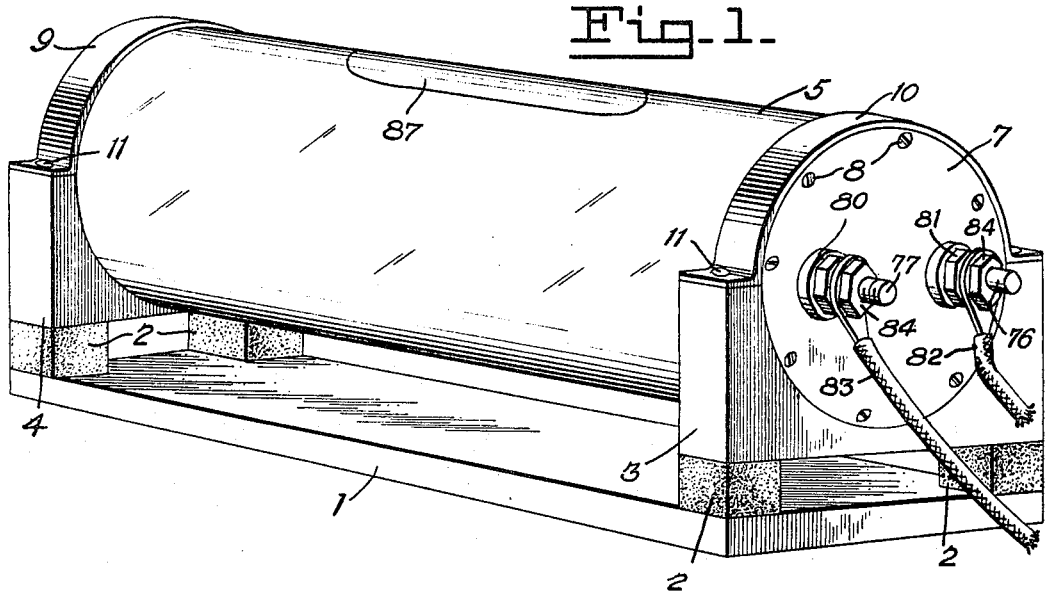
Fig. 1.
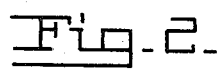
Fig. 2.
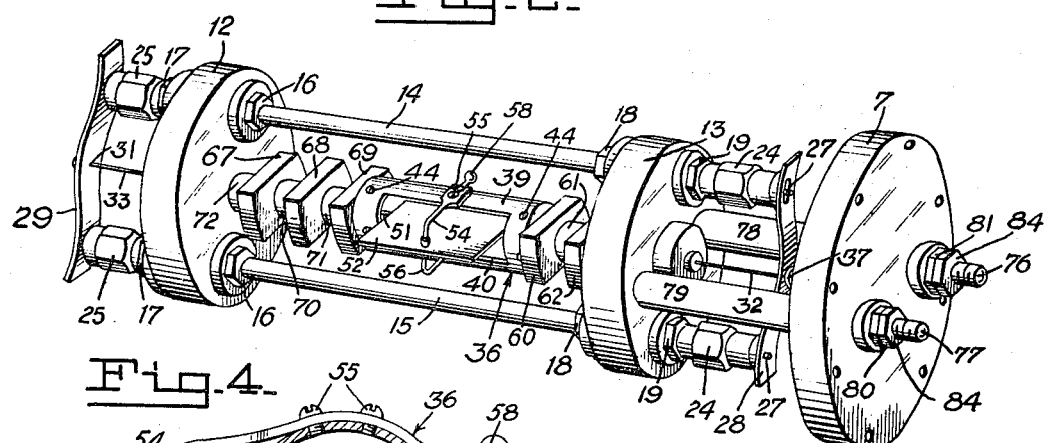
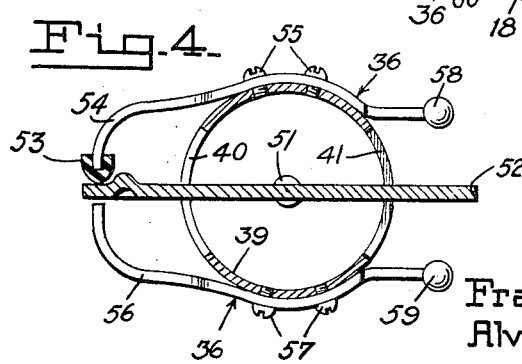
Fig. 4.
Inventors
Frank Wenner and
Alvin G. McNish
By J. H. Church & H. E. Thibodeau
Attorneys Dec. 17, 1968  F. WENNER ET AL  3,417,354
MAGNETIC CIRCUIT CLOSER
Filed July 23, 1947  2 Sheets-Sheet 2
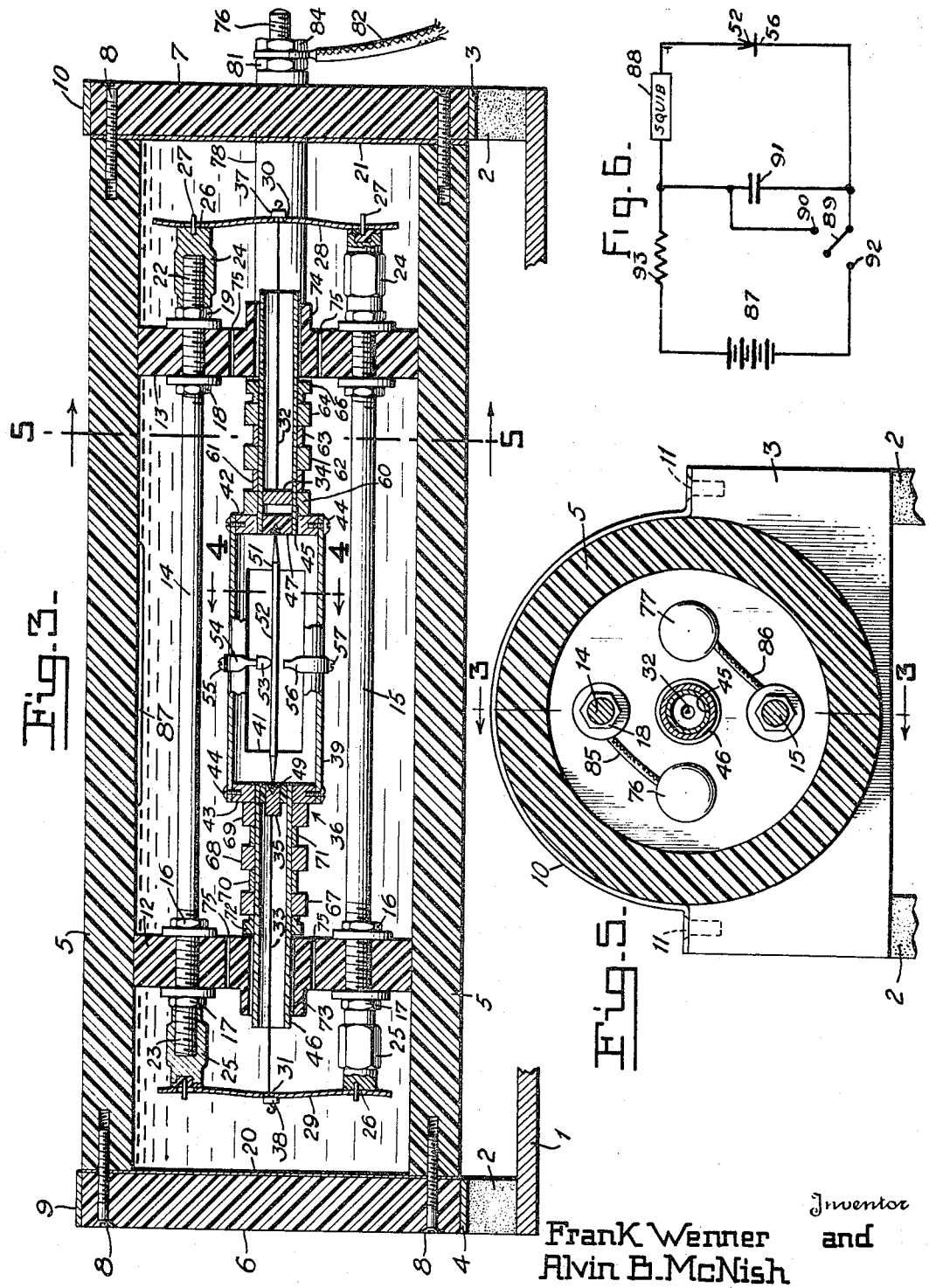
Inventor
Frank Wenner and
Alvin B. McNish
By J. H. Church + H. E. Thibodeau
Attorney

United States Patent Office 3,417,354
Patented Dec. 17, 1968

3,417,354
MAGNETIC CIRCUIT CLOSER
Frank Wenner, Washington, D.C., and Alvin G. McNish, Chevy Chase, Md., assignors to the United States of America as represented by the Secretary of the Army
Filed July 23, 1947, Ser. No. 763,056
5 Claims. (Cl. 335—205)

This invention relates to magnetically operated contact closers and more particularly to contact closers adapted to be operated by a change in the magnitude of the ambient portion of the earth's magnetic field.

In the present day warfare, the use of land mines to cripple, harass and destroy the enemy, is common. Certain of these mines are intended more particularly for use against vehicles composed largely of iron or steel, such as tanks, guns and trucks. While it is known to provide mechanism for firing such mines, responsive to the shock, pressure or impulse created by the passage thereadjacent of the vehicle that it is desired to cripple or destroy, there is no positive way in which such devices can distinguish between the pressure or jar created by the passage of other heavy objects of lesser importance, militarily speaking.

It is therefore an object of our invention to provide an instrument which combines maximum sensitiveness and ruggedness that will operate positively to close a circuit either to give a signal or to directly detonate a charge of explosive upon the adjacent passage of a vehicle composed of substantial quantities of magnetic materials such as iron or steel while being insensitive to the passage of vehicles or other objects composed mainly of non-magnetic materials and insensitive to gradual changes in intensity of the surrounding portion of the earth's magnetic field.

Another object is to provide a small light-weight mine actuator which can be easily hidden in grass or underbrush or can be readily concealed by the shallow burial, and which is readily transportable to the location where it is to be used.

Another object is to provide a safety circuit for mine fuzes controlled by our novel circuit closer whereby the mine will be in a safe condition for a predetermined time interval after it is armed so that operating personnel and vehicles may have time to withdraw to a safe distance.

Another object is to provide a circuit closer for the purpose aforesaid, that may be used against either land or marine vehicles and that may be constructed with varying periods of response, depending upon the particular use for which the instrument is intended.

A still further object is to provide a circuit closer of great sensitiveness wherein the supports for the moving system at the same time afford electrical connections thereto.

Another object is to provide a contact closing instrument, as aforesaid, that may have varying times of response merely by varying the separation of the contacting parts.

In the drawing:

FIGURE 1 is a perspective view of the complete circuit closer together with the resilient shock-proof mounting therefor, FIGURE 2 is a perspective view of the operating parts of the instrument when removed from their container, FIGURE 3 is an enlarged sectional view taken upon the plane indicated by the line 3—3, FIGURE 5 passing axially of the cylindrical container, FIGURE 4 is a section of the central hub of the instrument taken on a plane indicated by the line 4—4, FIGURE 3 and showing the two contacts and the interposed vane, FIGURE 5 is an enlarged section taken upon a plane indicated by the line 5—5, FIGURE 3 and showing the arrangement of the spacer rods and contact heads, FIGURE 6 is a circuit diagram of a safety circuit enabling a mine provided with our magnetic switch to be safely armed.

Referring in detail to the drawings, and particularly to FIGURE 1, the instrument selected for illustration comprises a base 1 having resilient elements, such as spongerubber blocks 2 at its corners. Supports 3 and 4 are connected to and rest upon respective pairs of blocks 2. Each support is recessed to receive the corresponding end of a cylindrical container 5 having end plates 6 and 7 secured thereto as by machine screws 8. Semicircular straps 9 and 10 are shaped to fit about the cylinder 5 and, when secured to respective supports 3 and 4, as by fasteners 11, act to clamp cylinder 5 and supports 3 and 4 firmly together. The base 1, supports 3, cylinder 5 and plates 6 and 7 are preferably formed of non-magnetic material.

A plastic such as "Lucite" has been found satisfactory for this purpose. Gaskets 20 and 21 are interposed between the ends of container 5 and end plates 6 and 7 and act to provide a fluid tight seal when screws 8 are turned down.

As shown in FIGURES 2 and 3, a pair of circular disks, 12 and 13, fit smoothly within cylinder 5. These disks are drilled at diametrically opposite points to receive spacer rods 14 and 15. As shown at FIGURE 3, each rod is threaded for a distance from each end and nuts 16 and 17 cooperate to rigidly connect rod 14 with disk 12 at one end of said rod, while nuts 18 and 19 act to rigidly connect said rod with disk 13 at its other end. Rod 15 is similarly connected with disks 12 and 13 whereby the rods and disks are united into a rigid frame.

It will be noted from FIGURE 3 that rods 14 and 15 project somewhat beyond disks 12 and 13 to afford portions 22 and 23 on which a pair of nuts 24 at the right hand end, FIGURE 3, and a corresponding pair 25 at the left hand end, are threaded. One nut of each pair is formed at its free end to receive an insert of dielectric material having therein a pin 27. The other nut of each pair is drilled directly to receive its pin 27. Thus, for example, the pin 27 at the right end of rod 15, FIGURE 3, may be electrically insulated from the rod while at the left end pin 27 of rod 14 may be so insulated. A bowed leaf spring 28 has a hole at one end of a size to snugly receive a pin, shown in FIGURE 3, as associated with spacer rod 15. At its other end, spring 28 has a short slot to slidably receive the pin 27 associated with rod 14, whereby, on flexure of the spring, the slotted end may move relatively to the corresponding pin. The construction and mounting of leaf spring 29 is the same as spring 28, so that a detailed description thereof is not necessary.

Spring 28 has a relatively large hole 30 through its central portion to provide for a sagging of the sensitive element subsequently to be described. Likewise spring 29 has a similar central hole 31. A metallic filament 32 is secured a tone end to a plug 34 of a sensitive element indicated generally by the numeral 36 and subsequently to be described. The other end of filament 32 passes through hole 30 in spring 28 and is there secured to a radially adjustable pin or washer 37 which can be shifted relative to spring 28 to properly center the magnet system. In the same manner, filament 33 is attached at its inner end to a core or plug 35, forming a part of sensitive element 36, and at its other end passes through hole 31 and is there attached to a similarly adjustable pin or washer 38. In this manner, the springs 28 and 29 coact to tension filaments 32 and 33 and to mount sensitive element 36 for pivotal movement about an axis passing through the centers of disks 12 and 13. Filaments 32 and 33 may be formed of fine Phosphor bronze wire.

The sensitive element 36 may consist of a central hub or cylinder 39 cut away at diametrically opposite sides to form openings 40 and 41. The ends of hub 39 are closed by means including rings 42 and 43 which fit within the ends of the hub and are secured thereto by means of screws 44. Each ring has a central aperture within which is secured one end of a tube section 45 or 46, to afford a structure in which said tubes are in axial alignment. These tubes are preferably of non-magnetic metal such as brass or aluminum. Tube 45 has a dielectric bearing plub 47 secured within its inner end in addition to the plug 34, previously mentioned.

Tube 46 has its inner end closed by a plug consisting of a central metallic bearing core 35, previously mentioned, surrounded by and secured to a ring 49 of dielectric material such as "Lucite" which ring is, in turn secured to tube 46. In this way metallic core 35 is insulated from its tube 46. Thus it will be noted that sensitive element 36 is mounted in a very sensitive manner, solely by filaments 32 and 33, for pivotal movement about the common axis of the inner ends of said filaments. At the same time disks 12 and 13 effectively prevent any excessive radial or axial play of the sensitive element. It will be further noted that filament 32 is in electrically conducting relation with hub 39 by way of plug 34, tube 45, and ring 42, while filament 33 is insulated from hub 39 by reason of dielectric ring 49.

Bearing plugs 35 and 47 are formed on their confronting faces with small metallic bearing inserts to receive the pointed ends of an axle 51 whereby the axle is delicately mounted for pivotal movement about an axis coincident with the axis of filaments 32 and 33. If desired, plug or core 35, or plug 47, or both, may be threaded into their supporting elements, namely, ring 49 and tube 45, respectively, whereby the adjustment of axle 51 in its bearings may be readily effected. A very light and thin metallic vane 52 of generally rectangular configuration, is secured radially of and in substantially symmetrical relation to, axle 51 so that its sides project a substantial distance through the openings in the hub 39, as clearly shown in FIGURE 4. However, the vane is slightly unbalanced as by weight 52a so that, normally, it is urged into engagement with a cap 53 of dielectric material secured on the end of a contact or stop arm 54. This arm is shaped as clearly shown at FIGURE 4 and is attached to hub 39 by screws 55. A second arm 56 is attached to hub 39 by screws 57, oppositely to arm 54, and is so shaped that its extended end is spaced slghtly a distance on the order of a few thousandths of an inch, from vane 52 when the latter is in position shown at FIGURE 4 relatively to hub 39. Both arms 54 and 56 may be provided with small counterweights 58 and 59. The counterweights 58 and 59 do not fully balance the system in the operative position, as the essential balance must be obtained by the opposing torques exerted by the magnetic system and by the filament twist on 31 and 32. By the mounting just described it will be noted that vane 52, when in the position shown in FIGURE 4, is insulated from filament 32 while, at the same time, in conducting relation with filament 33.

The sensitive element 36 includes magnet means for rendering the same sensitive to change in the intensity of the vertical component of a surrounding magnetic field. This magnetic means is shown in the form of six permanent bar magnets, three on tube 45 and three on tube 46, each magnet having a central hole to smoothly fit the tubes. For example, in assembly of the magnets on tube 45, a magnet 60 is first slid into contact with ring 42, followed by a spacer collar 61, a second magnet 62, a second collar 63, a third magnet 64, and a thrust collar 66. The magnets 60, 62, and 64 as well as spacers 61, 63 and thrust collar 66 are secured in place by an oil-resisting shellac or like adhesive. As the magnets on the tube 46 are arranged and secured in the same manner as has been explained in connection with the tube 45, it will be sufficient to identify magnets 67, 68 and 69, interposed spacers 70 and 71 and thrust collar 72. It will be understood that all magnets are positioned in the same relation about the axis of the sensitive element so that all North poles, as well as South poles, are aligned along respective axes parallel to the axis of filaments, 32 and 33, whereby all magnets tend to move into parallelism with the component of any external magnet field lying in a plane normal to the axis defined by the filamets. The magnets are preferably of material capable of storing large amounts of energy, such as "Alnico."

It will be noted that tubes 45 and 46 extend freely, without contact, through the central holes in disks 12 and 13, and that thrust collars 66 and 72 are out of contact with said disks so that the sensitive element is supported solely from and by filaments 32 and 33. In this manner a slight torque is sufficient to turn the element and an extremely sensitive instrument is provided. However, any longitudinal or lateral jar will cause the sensitive element to move only a very small distance, corresponding to the clearance between members 72 and 46 and the adjacent surfaces of disk 12 (or between tube 45 and thrust collar 66 and the adjacent surfaces of disk 13); the force of such jar will thereafter be absorbed by the rigid portions of the structure and not by the delicate suspension filaments, whose lateral resilience enable them to give laterally for the short distance corresponding to the spacing between the tube and the adjacent disk surface. Similarly the end springs 28 and 29 absorb the small motion corresponding to the spacing between the thrust collars and the adjacent disk surfaces. After the forces due to such jarring have subsided, the sensitive element is returned by the filament and spring resilience to its original freely suspended position. It is thus apparent that the construction shown combines ruggedness and sensitivity to a high practical degree. Holes 75 may be provided through the disks to equalize the pressure on both sides thereof. To hold the axes of the magnets in a horizontal plane which is the position of greatest sensitiveness to changes in the intensity of the vertical component of the magnetic field, it is necessary that an appropriate torque be supplied as by means of a twist in the filaments 32 and 33.

As shown upon FIGURE 5, disk 13 has a second pair of holes therethrough on a diameter normal to the diameter of the holes receiving spacer rods 14 and 15. Bolts 76 and 77 extend through these holes and are sufficiently long to extend also through holes in end plate 7, as shown in FIGURE 1. Each said bolt passes through a spacer tube 78 or 79 which act, when nuts 80 and 81 are turned down on bolts 76 and 77, to secure the entire mechanism within container 5, to end plate 7. Thus, when screws 8 through the aforesaid plate are removed, the entire operating mechanism may be removed as a unit with plate 7. Bolts 76 and 77 also serve as terminals for electrical conductors 82 and 83 which may be held secured thereto by suitable means such as nuts 84.

Referring to FIGURE 5, it will be noted that a short section of conductor 85 connects rod 14 with bolt 76, while another section of conductor 86, connects rod 15 with bolt 77. Thus it will be seen that, when vane 52 moves into engagement with the adjacent end of arm 56, that a circuit is closed through the device which may be traced from bolt 76, conductor 85, rod 14, nut 24, spring 28, filament 32, plug 34, and hub 39 to arm 56. In return the circuit leads by way of vane 52, axle 51, core 35, filament 33, spring 29, nut 25, rod 15, and conductor 86 to bolt 77. The conditions under which the circuit is closed will be subsequently explained. For the present, it should be noted that, while vane 52 is mounted in bearings supported on and by sensitive element 36, said vane is free to pivot independently of said element whenever a slight torque is applied to one that is not effective upon the other. The container 5 is filled with a suitable damping fluid such as kerosene. An air bubble 87 is left to provide for expansion of the liquid under increase in temperature. Of course, any other known means for permitting expansion and contraction, such as the expansible chambers used in connection with magnetic compasses, may be employed. Any of the known liquids used for damping liquid type magnetic compasses may be used in our instrument so long as it does not react on any of the materials within the container. It should be noted that the fluid in the container actually provides a second inertia member, which tends to remain stationary when a sudden torque is applied to the suspended magnet system due to a sudden change in vertical field intensity. This fluid inertia member is rather tightly coupled to the very light vane 52 by fluid friction; that is, the vane tends to follow closely the angular position of the fluid; the fluid is also similarly coupled to the suspended magnet system, but the latter coupling is much looser than the former coupling. For this reason, a slow change in angular position of the magnet can be followed by the vane 52, and the contacts will remain separated, but a rapid change in a direction tending to close the contacts 56 and 52 cannot be followed and the contacts will then close.

In operation, the device is buried in the path over which it is expected that any enemy vehicle will pass. A charge of explosive is buried or otherwise concealed adjacent or under the roadway and is provided with any known type of electrically-detonated fuze. The fuze is then connected in circuit with a source of potential and the circuit made to include terminals 76 and 77 through cables 82 and 83.

The device is designed to make use of the following situations:

Tanks, jeeps, trucks, gun mounts, etc., become magnetized because of the earth's magnetic field. Whether this magnetization is temporary, or more or less permanent, it results in an extra magnetic field which is carried with the vehicle when it moves.

Directly under the vehicle the field it carries with it, will, for the most part, be in the vertical direction as the locality is well away from the magnetic equator. Then the vertical component of the field carried along by the vehicle will be added to the normally existing vertical component of the earth's magnetic field.

Now consider that the contact-making device is planted at a particular spot directly over which the vehicle is to pass. As the vehicle passes over the particular spot, the vertical component of the earth's magnetic field is increased so the sensitive element is deflected, moving the insulated stop upward. In case the vehicle is moving at a very low speed, the increase in the vertical component of the field will be so gradual that the vane, in spite of the inertia and viscosity of the dampening fluid, maintains contact with the insulating strap.

While we have described our invention as used in connection with the detonation of land mines, it is intended also to be useful in detonating marine mines upon the adjacent passage of vessels constructed largely, or containing cargoes of magnetic materials. The adaptation of marine uses involves, basically, the alteration or lengthening of the period of response. Such period may be altered merely by altering the dimensions of the system.

It will be apparent that if the device above described is connected to a squib for arming of a mine, then in the event that the contacts have become accidentally closed or jammed, the mine will immediately explode, with great danger to the operating personnel. In order to avoid this we provide the safety circuit shown in FIGURE 6. This safety circuit provides an arming switch which is opened after the mine is fully prepared for operation and provides a safe interval (usually set for about five minutes) during which the mine will not explode even if contacts 56 and 52 are engaged. This gives the operating personnel and their vehicles sufficient time to withdraw to a safe distance.

Battery 87 is connected to fuze-cap or squib 88 through contactor 52, 56 previously described. Double-pole switch 89 normally engages contact 90 to maintain condenser 91 (for which an electrolytic condenser may be used) fully discharged. When the mine is ready to be armed, switch 89 is operated to disengage it from contact 90 and to engage contact 92. A very high resistance (approximately one megohm) 93 limits the current flow from battery 87 through fuze 88 to a few microamperes, which is insufficient to fire the fuze. After the desired safety interval of perhaps five minutes, the condenser will be fully charged to the battery potential. After this, whenever the contactor closes the condenser will discharge through the fuze to ignite same. With the firing device armed, the drain on the battery is little more than normal leakage of the electrolytic capacitor, which is so small that the apparatus may be left without servicing fully as long as the normal shelf-life of the battery.

We have thus invented a circuit closer that is safe and yet highly sensitive to sudden changes in the vertical component of the ambient magnetic field. It will be obvious to anyone skilled in the art that numerous changes, modifications, rearrangements and substitutions are possible without changing the basic principles or mode of operation of the instrument. It is our desire to reserve all such changes as fall within the scope of the subjoined claims.

Having now fully disclosed the invention, what we claim and desire to secure by Letters Patent is:

1. A circuit closer comprising a hub mounted for pivotal movement about an axis, first and second contacts carried by said hub offset from, and spaced in a plane normal to said axis, an inertia vane independently mounted for pivotal movement about said axis and having a portion interposed between said contacts, tensioned filaments mounting said hub and vane for pivotal movement, an electric circuit adapted to be closed by engagement of said vane with one of said contacts only, said circuit including said filaments.

2. In a device as covered by claim 1, a sealed container within which said circuit closer is positioned, said container being substantially completely filled with a liquid, having a greater inertia means than said vane and closely coupled thereto by fluid friction.

3. A circuit closer comprising a sensitive element, a pair of aligned tensioned filaments mounting said element between them for pivotal movement about an axis, said element including a first contact offset from said axis, means on said element for independent pivotal movement about said axis, a second contact on said means, an electric circuit including said contacts and filaments, insulated stop means limiting separation of said contacts, said means being yieldingly urged into engagement with said stop means, and magnet means connected to control the position of said element about said axis.

4. A circuit closer comprising, a frame, a hub, a pair of aligned filaments each secured at one end to said frame and at its other end to said hub, means carried by said frame and tensioning said filaments to thereby journal said hub for rotation about an axis substantially coinciding with said filaments, a vane, spaced bearings in said hub aligned with said axis mounting said vane for pivotal movement relatively to said hub, one said bearing being insulated from its filament and the other bearing being in electrical contact with the other of said filaments, the first-named filament being in electrical contact with said hub, a contact and an abutment on said hub, both offset from said axis, said vane being biased into normal engagement with said abutment, and permanent magnet means connected to rotate said hub in response to changes in the vertical component of the external magnetic field to thereby cause engagement between said contacts.

5. In a circuit closer, a hub, first and second aligned tube sections fixed to and extending in opposite directions from said hub to define an axis of rotation, spaced bearings carried by said hub in alignment with said axis, a contact and an electrically insulated abutment on said hub offset from said axis, a vane pivoted in said bearings and adapted to engage said contact or said abutment, on rotation relatively to said hub, directing magnets on said hub to positionally control the same about said axis, and tensioned filaments extending axially along each tube to pivotally mount said hub and tube sections.

References Cited

UNITED STATES PATENTS

| | | | | |
|---|---|---|---|---|
| 948,424 | 2/1910 | Long | | 200—87.3 |
| 2,302,982 | 11/1942 | Strickland | | 200—87.3 |
| 2,240,891 | 5/1941 | Marchant | | 200—87.3 |
| 2,255,187 | 9/1941 | Reasoner | | 200—873. |
| 2,397,137 | 3/1946 | Glennon et al. | | 200—87.3 |
| 1,795,972 | 3/1931 | Ruhlemann | | 102—70.2 |
| 1,382,374 | 6/1921 | Maxim | | 102—18 |

FOREIGN PATENTS

| | | |
|---|---|---|
| 119,086 | 9/1918 | Great Britain. |
| 170,117 | 10/1921 | Great Britain. |
| 549,998 | 12/1942 | Great Britain. |
| 668,368 | 12/1938 | Germany. |

BERNARD A. GILHEANY, *Primary Examiner.*

U.S. Cl. X.R.

335—207; 200—166, 6, 52, 61.41